US009521164B1

(12) United States Patent
Angiolelli et al.

(10) Patent No.: US 9,521,164 B1
(45) Date of Patent: Dec. 13, 2016

(54) COMPUTERIZED SYSTEM AND METHOD FOR DETECTING FRAUDULENT OR MALICIOUS ENTERPRISES

(71) Applicants: Frank Angiolelli, Milford, PA (US); Eric Feinberg, Orangeburg, NY (US)

(72) Inventors: Frank Angiolelli, Milford, PA (US); Eric Feinberg, Orangeburg, NY (US)

(*) Notice: Subject to any disclaimer, the term of this patent is extended or adjusted under 35 U.S.C. 154(b) by 0 days.

(21) Appl. No.: 14/597,334

(22) Filed: Jan. 15, 2015

Related U.S. Application Data

(60) Provisional application No. 61/927,962, filed on Jan. 15, 2014, provisional application No. 62/045,682, filed on Sep. 4, 2014.

(51) Int. Cl.
*G06F 12/16* (2006.01)
*H04L 29/06* (2006.01)
*G06F 17/30* (2006.01)

(52) U.S. Cl.
CPC ..... *H04L 63/1483* (2013.01); *G06F 17/30873* (2013.01); *H04L 63/1416* (2013.01); *H04L 63/1433* (2013.01)

(58) Field of Classification Search
CPC ............ H04L 63/1416; G06F 17/30873
USPC .......................................................... 726/22
See application file for complete search history.

(56) References Cited

U.S. PATENT DOCUMENTS

| | | | | | |
|---|---|---|---|---|---|
| 7,438,226 | B2* | 10/2008 | Helsper | ............... | G06Q 30/06 235/375 |
| 7,603,699 | B2* | 10/2009 | Abdulhayoglu | ........ | G06F 21/57 345/24 |
| 7,831,915 | B2* | 11/2010 | Averbuch | ............ | G06F 21/6218 715/738 |
| 7,865,953 | B1* | 1/2011 | Hsieh | ................ | G06F 17/30887 726/22 |
| 8,161,130 | B2* | 4/2012 | Stokes | ................ | H04L 63/1408 709/217 |
| 8,374,983 | B1* | 2/2013 | Pohl | .................. | G06F 17/30873 706/46 |
| 8,549,099 | B2* | 10/2013 | Sebastian | .......... | G06F 17/30887 380/54 |
| 8,813,239 | B2* | 8/2014 | Tibeica | ............... | H04L 63/1483 726/26 |
| 9,083,733 | B2* | 7/2015 | Georgiev | ............ | H04L 61/1511 |
| 9,112,897 | B2* | 8/2015 | Teo | ........................ | G06F 21/566 |
| 9,154,459 | B2* | 10/2015 | Swanson | ............. | H04L 63/0227 |
| 9,215,243 | B2* | 12/2015 | Bommireddipalli | | H04L 63/1416 |
| 9,251,282 | B2* | 2/2016 | Loder | ................ | G06F 17/30887 |
| 2008/0028463 | A1* | 1/2008 | Dagon | .............. | H04L 29/12066 726/22 |

(Continued)

FOREIGN PATENT DOCUMENTS

WO    WO 2009/131469    * 10/2009    ............. G06F 21/00

OTHER PUBLICATIONS

Declude, "List of All Known DNS-based Spam Databases", Apr. 20, 2004, Declude.com, pp. 1-15.*

*Primary Examiner* — Nabil El Hady
(74) *Attorney, Agent, or Firm* — Carlson, Gaskey & Olds, P.C.

(57) ABSTRACT

A computer system and method for determining the legitimacy of a website determines the presence of a relationship between a received website and at least one known illegitimate website. When such a relationship is detected, the received website is determined to be illegitimate and corresponding action may be taken.

15 Claims, 6 Drawing Sheets

(56) References Cited

U.S. PATENT DOCUMENTS

| | | | |
|---|---|---|---|
| 2009/0077617 A1* | 3/2009 | Levow | H04L 12/585 726/1 |
| 2012/0159620 A1* | 6/2012 | Seifert | H04L 63/1416 726/22 |
| 2013/0097702 A1* | 4/2013 | Alhamed | G06F 21/64 726/22 |
| 2013/0159319 A1* | 6/2013 | Duan | G06F 17/30873 707/748 |
| 2013/0254530 A1* | 9/2013 | Amir | G06F 21/52 713/150 |
| 2015/0007312 A1* | 1/2015 | Pidathala | H04L 63/145 726/22 |
| 2015/0067853 A1* | 3/2015 | Amrutkar | H04L 63/14 726/23 |
| 2015/0244728 A1* | 8/2015 | Tao | H04L 63/14 726/23 |
| 2016/0088015 A1* | 3/2016 | Sivan | H04L 29/06 726/23 |

* cited by examiner

COMPUTERIZED SYSTEM AND METHOD FOR DETECTING FRAUDULENT OR MALICIOUS ENTERPRISES

PRIORITY CLAIM

This application claims priority to U.S. Provisional Application No. 61/927,962 filed on Jan. 15, 2014 and to U.S. Provisional Application No. 62/045,682 Filed on Sep. 4, 2014.

TECHNICAL FIELD

The present disclosure relates generally to a computerized process for automatically or semi-automatically detecting a fraudulent or malicious enterprise.

BACKGROUND

The internet is an exceptional platform for the creation, distribution and consumption of content. Increasingly, content is created which is intended for illegitimate purposes, such as fraud, exploitation, social engineering, malware, counterfeit sales and the like. Identifying such content can be exceedingly challenging for various reasons.

Large scale fraudulent or malicious enterprises conduct operations using technologies which allow for the creation, replication and mass distribution of content online. Additionally, these enterprises establish affiliate marketing schemes which de-centralize operations. Once such enterprises are established, resiliency of the enterprises is established through distributing operational support across multiple IP addresses and websites.

Interdicting offending content through existing methods such as domain name seizure is costly and manual, thereby placing protection and prevention at a significant disadvantage when compared with the automatic programmatic replication being employed by transnational criminal enterprises, malicious groups and malicious individuals.

SUMMARY OF THE INVENTION

Disclosed is a method for determining a legitimacy of a received website including determining a presence of a relationship between a received website and at least one known illegitimate website and determining that the received website is illegitimate in response to determining the presence of the relationship.

Also disclosed is a method for determining a legitimacy of a website comprising: retrieving website content from a website, analyzing the website content and determining a website score based at least partially on the analysis, determining that the website is illegitimate in response to the website score exceeding a threshold, and storing the determination in a data storage element.

Also disclosed is a computer system including: a first computer connected to the Internet, wherein the first computer a data storage element interfaced with the first computer such that the first computer is operable to query the data storage element and operable to store and edit data stored in the data storage element, wherein the data storage element is further operable to store previously analyzed website information, a user interface operable to allow a user to interact with and control the first computer, and a non-transitory computer readable medium storing instructions operable to cause the first computer to perform the steps of retrieving website content from a website, analyzing the website content and determining a website score based at least partially on the analysis, determining that the website is illegitimate in response to the website score exceeding a threshold, and storing the determination in the data storage element in response to at least one command received at the user interface.

These and other features of the present invention can be best understood from the following specification and drawings, the following of which is a brief description.

DETAILED DESCRIPTION

The following details a basic description of the system and method for detecting fraudulent or malicious enterprises. A more detailed description is provided below with regards to FIGS. 1-6.

The system and methodology disclosed herein is used to detect fraudulent or malicious enterprises and is enriched by domain ownership and geolocation data. The enrichment serves three specific goals. The three goals are: first, to differentiate between legitimate, non-malicious content and counterfeit, malicious or fraudulent content, second, to enrich that analysis with data from domain ownership both providing analysis and attribution data, and third, to correlate data points extracted during the analysis. The correlation of data points further allows the system to identify broader operations indicating organized enterprises conducting large scale operations over multiple websites. This information may then be used to create detective methodologies or preventative controls depending on the specific usage and desires of the implementation.

Pattern recognition methods are applied to the gathered information, and commonalities are extracted among offending content for the purposes of differentiating between legitimate and illegitimate content. The system then uses parsers to extract a series of data points from the commonalities. The data points are input into a data storage system used for the purposes of identifying and storing patterns, data points and enriched content such as geolocation of the IP address hosting the sites.

The content of websites is passed through a series of algorithms scoring the content using mathematical numbers on multiple characteristics. These algorithms are then used to identify websites of exactly identical content, and similar, but not exactly identical, content and construction.

The result of the analysis is a unique analysis of a website or URL, resulting in a correlation of web sites based on attribution, on construction/content similarities and on identified blacklist content.

Illegitimate, for the purposes of this description, describes domains, URLs, websites, and enterprises that present information or goods which are counterfeit, forged, malicious or otherwise intended to present fraudulent information.

Offending content, for the purposes of this description, is used to describe content which has been identified as presenting illegitimate content.

An enterprise, for the purposes of this description, refers to one or more individuals operating multiple websites, domains, URLs, or similar means of disseminating information.

A more detailed disclosure is included below, with reference to FIGS. 1-6.

Figure 1:
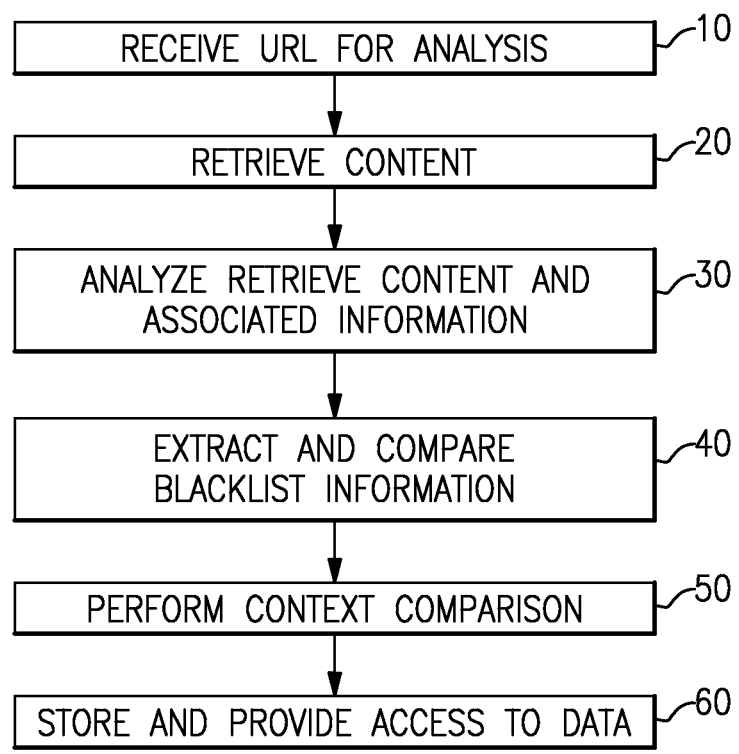
FIG. 1 illustrates a general overview of a process for determining a legitimacy of a website.

FIG. 1 illustrates a general overview of a process for detecting illegitimate websites. The invention utilizes various methods to analyze web content, including machine and non-machine learning methods, as well as inference based on non-specific pattern recognition. This pattern recognition may take the form of specific textual analysis or analysis of text converted into non-text representations of the data. Specific textual patterns are assigned weights for the purposes of establishing a preponderance of evidence that the content is consistent with known patterns of non-legitimate objectives which can include: fraud, counterfeit materials, illegitimate sales and the malicious presentation of code (including social engineering and exploitative code).

When the system receives a website or URL for analysis in a receive URL for analysis step 10, the system retrieves the content of the website, extracts the domain information, and performs a lookup of the registrant of the domain and geolocates the IP address in a retrieve content step 20. In alternative examples, additional relevant information can be retrieved using an automated information retrieval process during the retrieve content step 20. Once the information is retrieved, the system passes the content and domain registrant information through an analysis engine in order to analyze retrieved content and associated information step 30. The analysis engine analyzes the information based on multiple tests including machine and non-machine based learning. Patterns identified in the system are assigned numerical values and weighted, with the corresponding weighting being based on observational and experimental data.

The numerical values assigned to the content are then aggregated. Upon completion the above content based analysis, parsers extract specific information from websites including email addresses and other similar identifying information in an extract and compare blacklist information step 40. The identifying information is then compared to blacklists stored in a data storage location, such as a database.

Next, a context comparison is made to identify offending content on websites that do not trigger the blacklist in a perform context comparison step 50. The system utilizes various methods to achieve the objective of identifying offending content. The methods include identification of: known text, patterns of text, elements of the construction of a website including web design code, elements of the presentation of the website including layout and ordering of data presentation, elements of the domain ownership information, geolocation information, hosting information, parsed data including email addresses and phone numbers, website metadata, analysis of the textual patterns in contact information, complexity of the website code, rating the degenerative elements of the site, the density to which code is presented on a line by line basis (line density).

To determine the line density of a website, a line density algorithm is utilized. The line density algorithm provides a method for creating a numerical representation of a website based on the size of the website and the number of lines of codes utilized to create the website. The representation is created by establishing the number of bytes in the content being analyzed divided by the number of lines being used to present that content.

$$LD=s/l$$

Where LD is the line density, s is the size of the content and l is the number of lines being used to present that content.

In another example, the context comparison uses inference to achieve a probability score based on the overall content of the site. The computer system infers a likelihood of illegitimate intent for the website based on objective website content. In some examples, the inference is based purely on programmed inference algorithms. In other examples, the inference includes a human analysis element combined with a computer analysis. These methods utilize machine learning to increase the density of the known text and patterns of text information used to identify offending content. Some examples also use textual analysis methods to identify patterns of text as well as a plurality of elements used in presenting the text.

The determined information is then stored in a data storage element and presented in a user interface, such as a management console, which provides an interactive method to view the data being stored in the data storage system, as well as aggregating data in a store and provide access to data step 60. User designed queries stored in the management console allow the system to achieve automatic identification of websites related to each other as discovered through the system.

In a further example, the context comparison can be utilized to generate a network visualization correlating multiple websites with multiple other websites. The network visualization identifies similarities between each of the websites and can be used to easily identify enterprises of connected websites based on common similarities found in multiple websites. By way of example, the similarity can be a correlation between at least one of a website text, a website code, and website information of the related websites. In some embodiments, the network visualization can be a relationship diagram, relationship matrix, or other visual representation of the correlation between elements in the network.

In some examples, the similarity information linking multiple websites can include ownership information, whois information, or other identifying information as to the owner or operator of the related websites. In such an example, the relationship between the related websites can be used to identify an illegitimate enterprise, or other organization.

Figure 2:
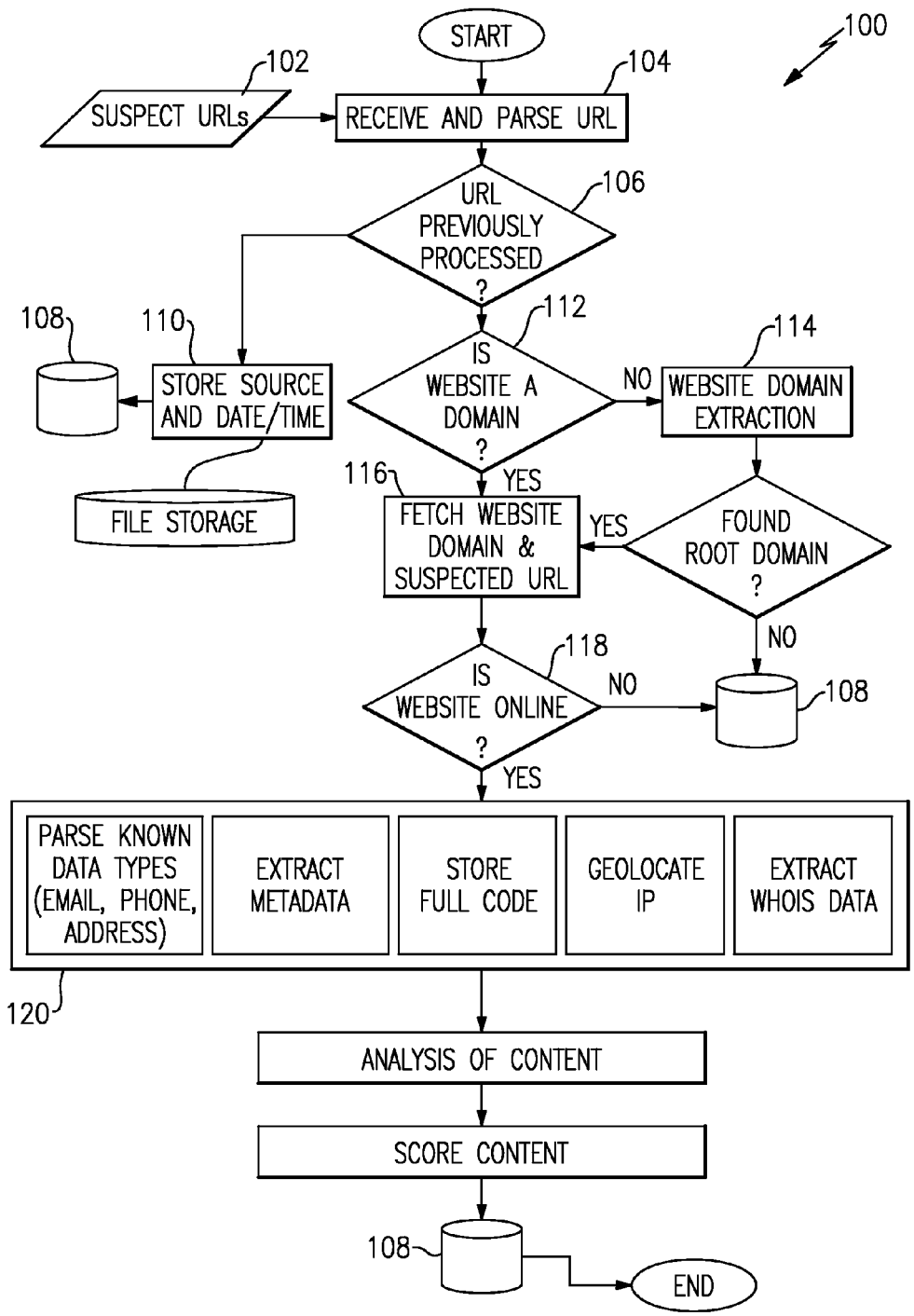
FIG. 2 illustrates a method for analyzing and scoring a legitimacy of a website's content.

FIG. 2 illustrates a general process flow 100 for scoring a website. Suspected URLs 102 are identified and presented to the analysis system using various methods, as described above. The suspected URLs are received in the receive and parse URLs process 104 running on the system. The URL is then parsed by the system using the receive and parse URL process 104. The parsing includes separating the URL into underlying component parts, and storing each part in a corresponding database. In some examples, each part is stored as a text string. The system then checks if the parsed URL has already been processed in a URL previously processed check 106. If the URL has been previously processed, the system logs the source as well as date and time into a data storage 108 using a store source and date/time process 110.

The system then identifies if the URL is a website domain or a URL residing on a website domain in an URL a website domain check 112. If the website is a URL, the system then extracts the website domain from the URL using a website domain extraction process 114. If the root domain is found, the system provides the domain to a fetch website domain and suspected URL process 116. Similarly, if the parsed URL is a domain, the domain is provided to the fetch website domain and suspected URL process 116. When no root domain is found, the URL is moved to the data storage 108 and stored. In some examples, the system also downloads and saves a complete or semi-complete copy of the website.

Once the URL has been parsed and checked, the system checks if the site is online or not in an is website online check 118. If the site is not online, that information is logged into the data storage 108. If the system is online, the system continues to a website analysis process 120.

In the website analysis process 120, the system extracts parsed data from the site data based on predefined patterns of information of interest. Next, a series of other steps are performed which achieve the extraction of metadata from the site, storage of the full code, geolocation of the IP address hosting the site and a lookup of the registrant information using methods and process that are known in the art.

Once extracted, the system analyzes the content using a content analysis process described in more detail below with regards to FIG. 3. The analysis is achieved through the identification of known text, known text patterns, comparison tests against a blacklist, calculations of entropy, complexity and line density, creating and comparing a HASH value of the content and storing those patterns in a storage engine. These tests are used to increment a scoring system which presents a resultant value at the end of the analysis. Sites which score above a pre-determined threshold, are considered offending content. The threshold can be determined by one of skill in the art, having the benefit of this disclosure, using any empirical determination method.

Figure 3:
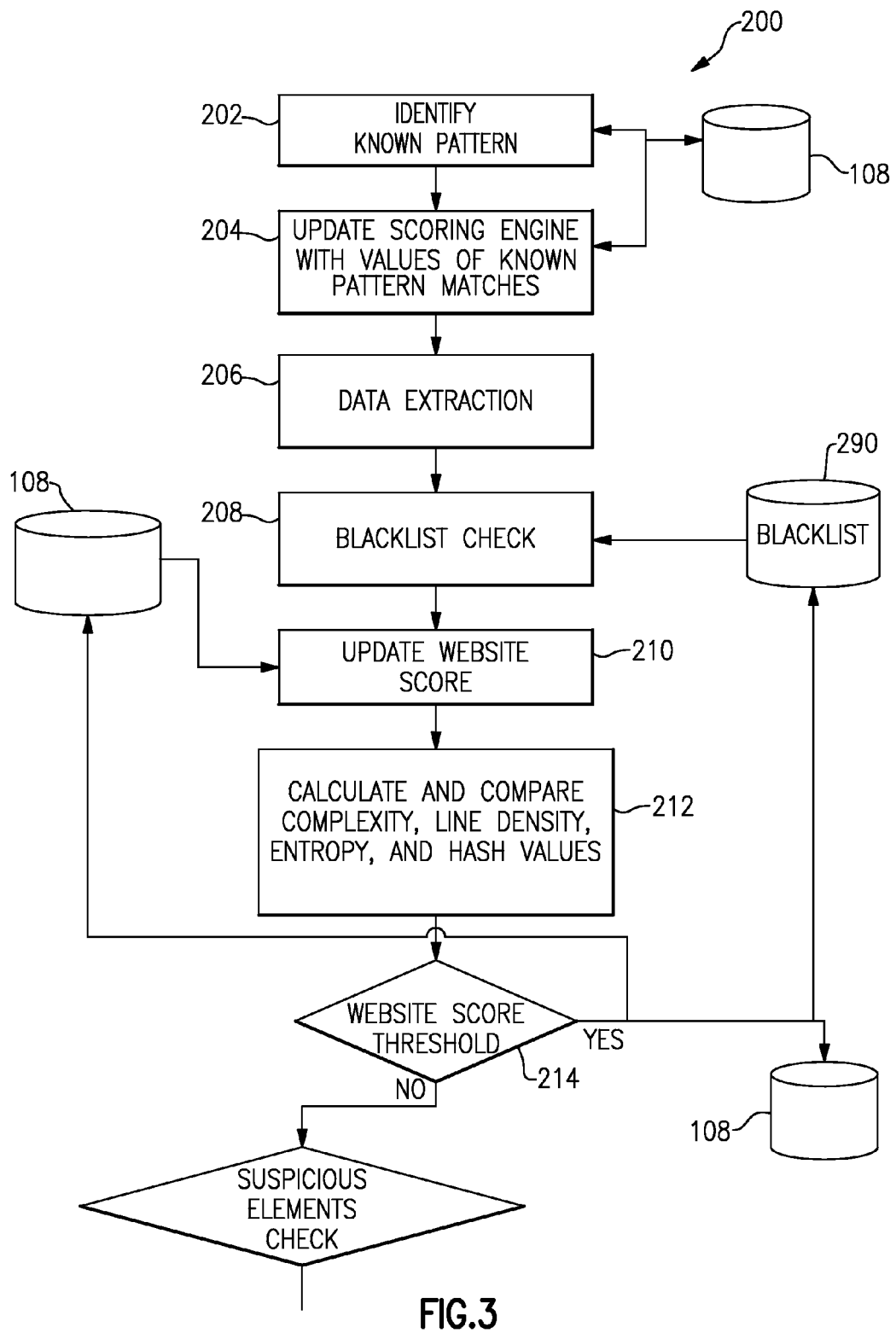
FIG. 3 illustrates a process for aggregating scored websites and determining between illegitimate and legitimate websites based on the aggregated scoring.

FIG. 3 illustrates an automatic content analysis method 200 performed by the system on the identified website. Initially the system identifies known patterns and parameters in an identify known patterns process 202. The known patterns can be stored in the data element 108 described above. In alternative examples, the known patterns can be stored in a separate data storage element, or in a segregated portion of the data storage element 108.

Once the known and existing patterns are identified, a scoring engine in the system is updated with relevant values for pattern matches based on the previously retrieved known patterns in an update scoring engine with values of known pattern matches process 204. By way of example, specific e-mails, domains, types of code, etc can each be identified from the known patterns and assigned a score. For each match the website being analyzed has to one of the identified elements, the assigned score can be added to the overall website score.

After the scoring engine is updated for all known patterns, established data types, such as email address, mailing addresses, phone numbers, code types, images, templates and the like, are extracted from the website, or retrieved from the data storage 108, if they have been previously extracted. This process is referred to as a data extraction process 206. The data extraction process 206 can be performed using any system known in the art including existing data parsers, website scrapers, and the like.

Once each of the data elements has been isolated in the data extraction process 206, the data elements are compared to a blacklist 290 in a blacklist check process 208. If any of the data elements match an element on the blacklist, a corresponding score is added to the websites score in an update website score process 210. After comparing the data elements to a blacklist and updating the website score, the system calculates the website line density, code complexity and a HASH value for the website using processes known and described herein. The complexity, line density and HASH values are then compared to known complexity values, line densities and HASH values stored in the data storage 108 in a calculate and compare line density, code complexity and HASH values process 212.

If any of the calculated values are within a tolerance value of a stored value from the data storage 108, a corresponding score is added to the overall website score.

Once the website score has been tabulated, the overall website score is compared against a website score threshold in a website score threshold check 214. If the overall website score meets or exceeds the threshold, the website is flagged as an illegitimate website, and the classification is stored in the data storage 108. If the website score is below the threshold, the system checks to determine if the site contains any suspicious elements, and if any suspicious elements are identified the website is flagged for manual review in a suspicious elements check 216. From this point, the system passes to a manual review process 300, described below with regards to FIG. 4.

Since human analysis and validation of data is an important part of quality control processes, a programmatic method is performed after the automatic analysis to identify suspicious keyword matches and similar mathematical representations of the content which have not scored above the threshold. Suspicious sites below the threshold are flagged for manual review.

Figure 4:
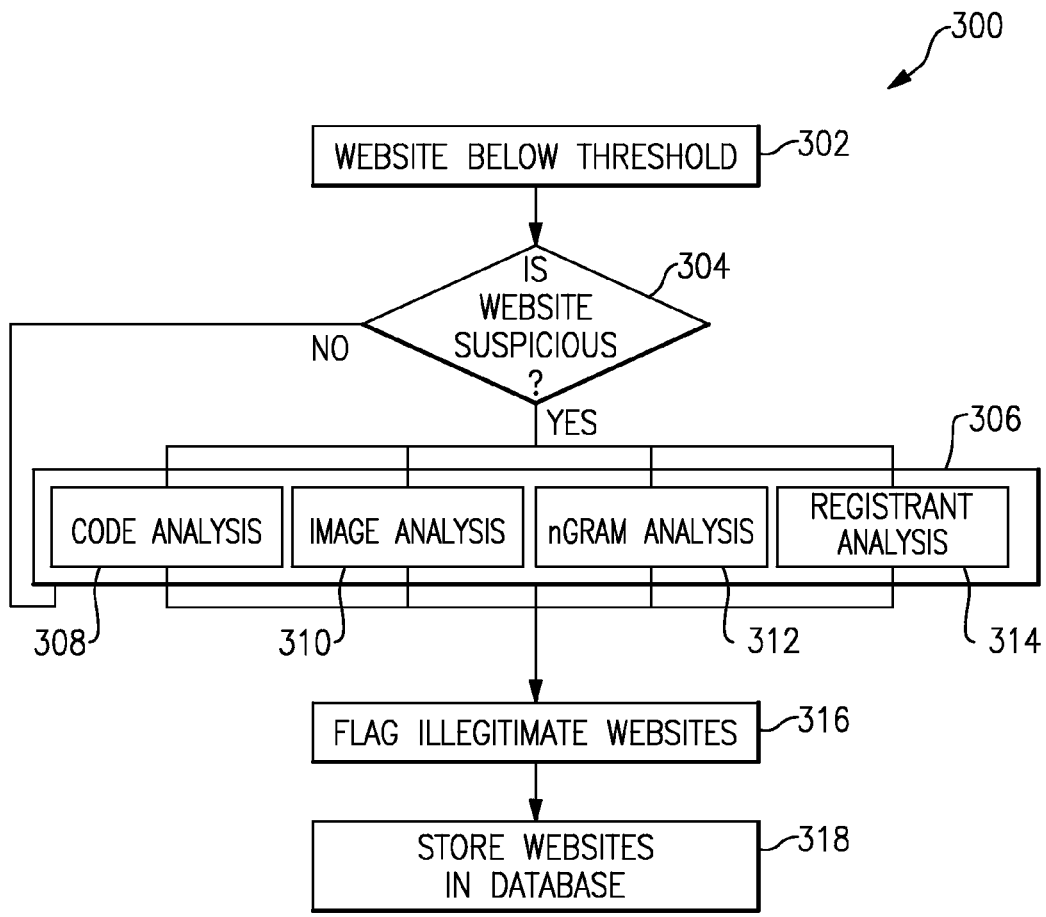
FIG. 4 illustrates a manual review process for suspicious sites that score below the threshold value.

FIG. 4 illustrates the manual review process 300 in more detail. As described above, an initial programmatic review of the website determines that the website score is below a threshold in a website below threshold step 302. When the website score is below the threshold, the system performs an is website suspicious check 304. The is website suspicious check 304 utilizes one or more of keyword matches and mathematical representations of the content, as would be understood by one of ordinary skill in the art having the benefit of this disclosure.

If the website is not suspicious, the website, and the not suspicious status is logged in the data storage 108. If the website is suspicious, the system moves on to a manually reviewed pattern analysis 306. The manually reviewed pattern analysis can include a code analysis 308, an image analysis 310, an nGram analysis 312, a registrant analysis 314, or any combination of the analysis methods. Further additional methods of analysis can be used to perform the manual analysis either alone or in combination with the previously listed methods. The manually reviewed pattern analysis can be a fully manual process where an operator manually reviews all the elements of the website, or a partially automated process where the operator uses computer assisted tools to review and analyze portions of the website. Furthermore, it is within the conception of this disclosure that the manual review can include any similar type of manual or semi-manual analysis and is not limited to the four described types.

Sites not deemed illegitimate after the manual review are stored in the data storage element 108. Sites deemed illegitimate during the manual review are flagged as illegitimate in a flag illegitimate websites process 316. The flagged web sites are then stored in the data storage 108 in a store websites in database process 318.

The final output of the manual review (illustrated in FIG. 4) and the automatic analysis is stored in the data storage 108, and can be accessed or utilized by other systems or at a later time.

Figure 5:
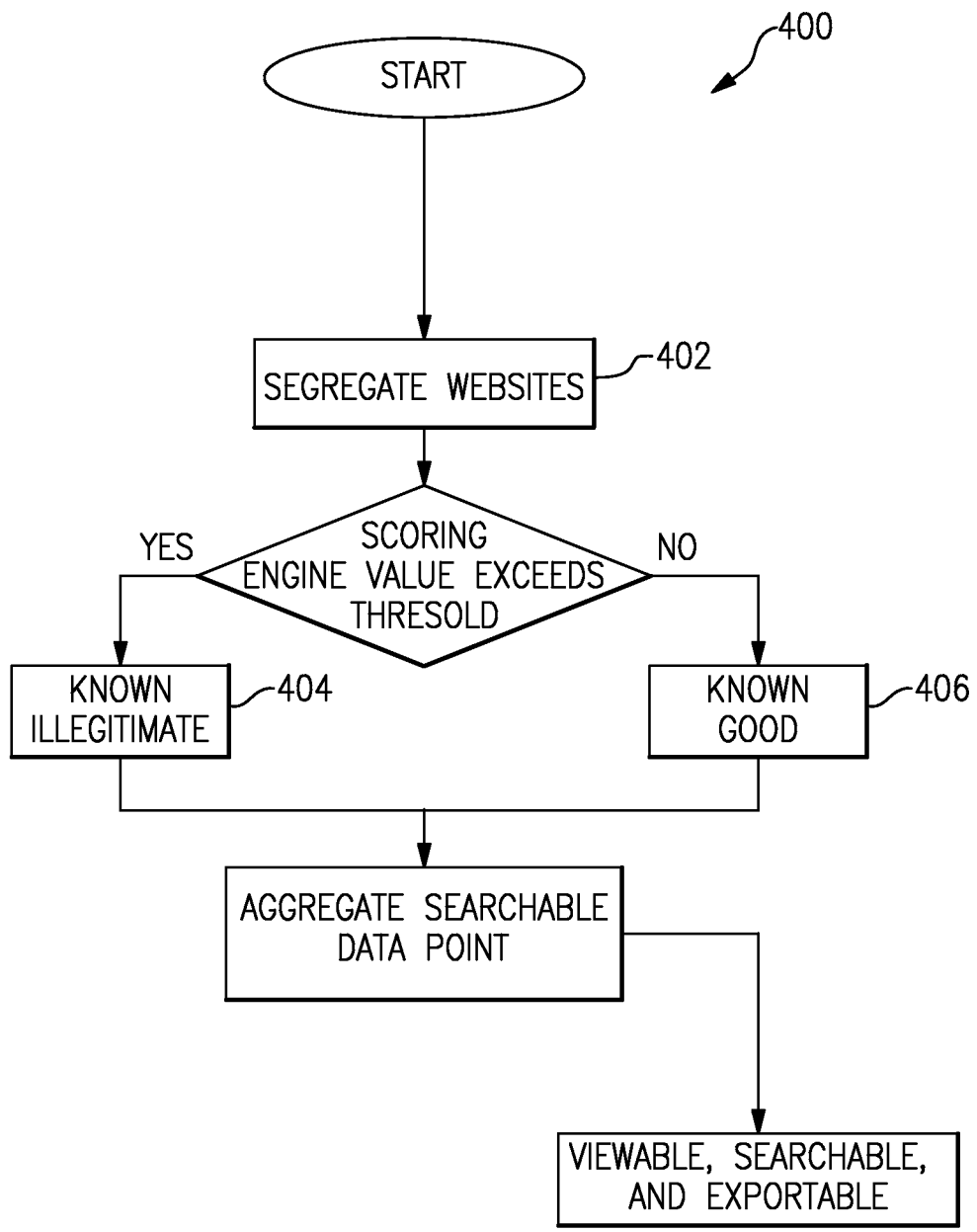
FIG. 5 illustrates a process of analyzing the content of a website.

FIG. 5 illustrates a method 400 for utilizing the information stored in the data storage 108. After a user starts the method 400, such as by accessing a console or other computer interface, the method sorts the stored websites and segregates the websites into discreet groupings according to their associated website score in a segregate websites process 402. Once segregated, the websites are sorted into known illegitimate websites 404 and known good websites 406. The websites are then correlated into aggregate data points encompassing multiple websites and formed into searchable data points in an aggregate searchable data points process 408.

The aggregated data points in this system are queriable and can be viewed and further aggregated, as they are derived from the data storage 108. In some examples, the data in the data storage 108 is exportable into various common data types, including, but not limited to, comma separated format, xml and xls formats.

Figure 6:
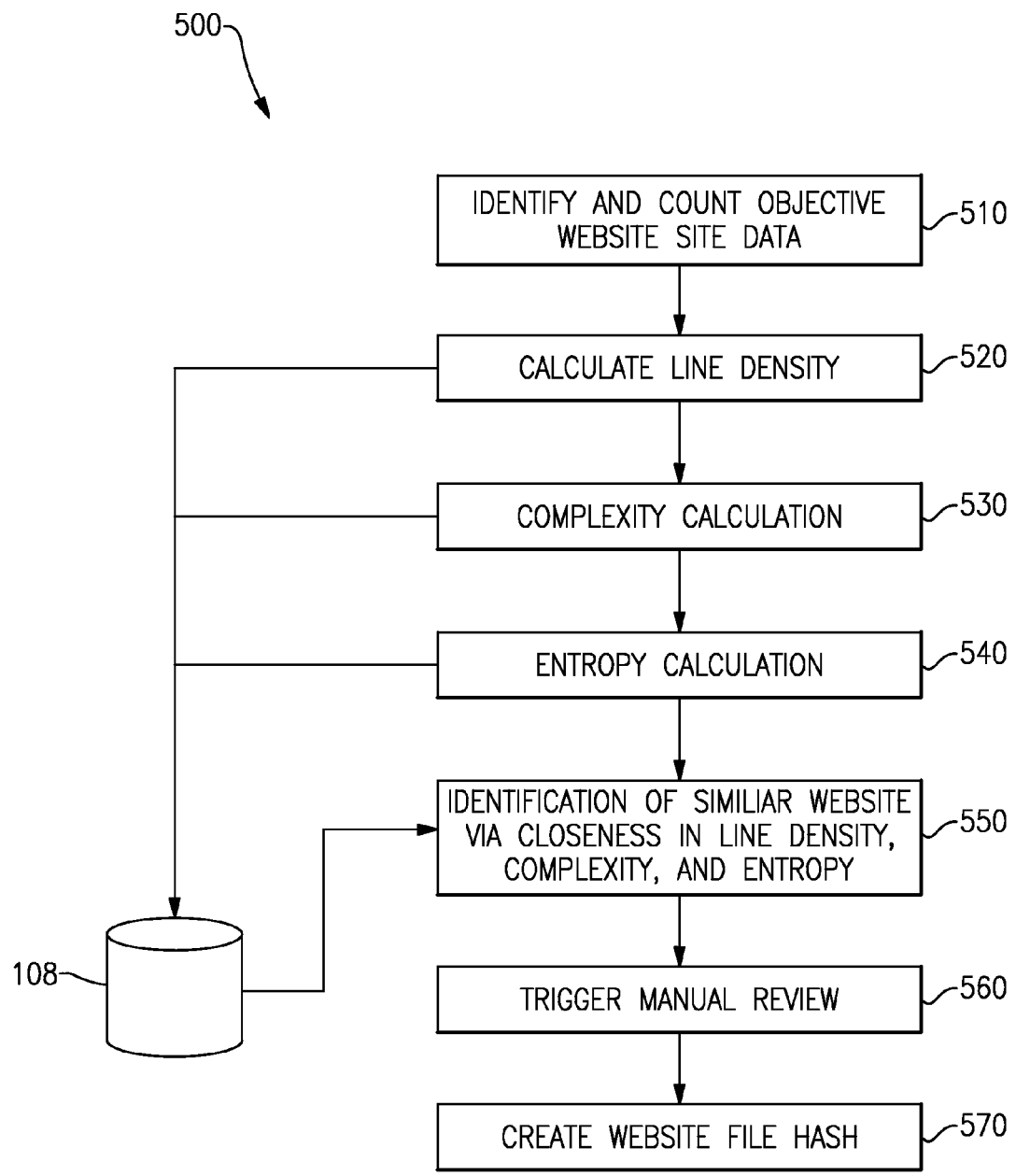
FIG. 6 illustrates a detailed process for determining a HASH value of a website.

FIG. 6 illustrates a more detailed description for the calculation of complexity, line density and HASH values process 212, illustrated in FIG. 3. In other words, FIG. 6 details an example process and method 500 by which similar content is identified programmatically using mathematical calculations. The content is reviewed to identify the size of the content and the number of lines of in the content. This is used to perform the Line Density Algorithm, which represents the average number of bytes per line presented by the content. Next, the system performs an entropy calculation to identify the average amount of information contained in the content. After completing the entropy calculation, a complexity algorithm calculates the computability resources required to create the object.

Initially, the system identifies the size (memory required to store) the web site file and identifies the number of lines of code contained within the website file in an identify and count objective website file data step 510. In other examples, additional objective characteristics of the website file can be utilized in place of, or in conjunction with, the above exemplary characteristics. Once the objective website file data has been identified and counted, the system determines the line density of the website file in a calculate line density step 520. After calculating the line density, the system calculates a website file complexity and a website file entropy in a respective complexity calculation step 530 and entropy calculation step 540. The Line density, complexity and entropy are calculated using the previously described processes and the results are stored in the data storage 108 at the conclusion of the respective step 520, 530, 540.

The system then queries for sites which are constructed of similar line density, entropy and complexity within an established threshold in an identify similar websites via closeness in line density, complexity and entropy step 550. The identification can be performed using any known data lookup/comparison method and using standard querying techniques to query the data storage element 108.

After querying, any sites which contain matches in all three steps 530, 540, 550 are established as being sufficiently likely to be illegitimate, and a manual review is triggered in a trigger manual review step 560. Finally, the system performs a HASH of the website file in a create website file HASH step 570. to create a value representation of the content by which exact matches of the content between website files can be performed.

With reference to all of FIGS. 1-6, the system and methods as well as the outputs resulting from the system and methods can be used in several exemplary capacities to improve the security of the internet. By way of non-limiting example, the system can be used to identify offending content, to identify large scale enterprises creating this content for the purposes of law enforcement prosecution, as a preventative control when the patterns and blacklists are output to a network based platform capable of blocking content known to match content used by person(s) engaged in creating offending content, and as an intelligence feed for Online Service Providers (OSP) and other third parties to identify websites, email addresses and various other content, metadata and users violating End User License Agreements, Acceptable Use Policies or otherwise exposing the OSP to risks associated with hosting this content.

It is further understood that any of the above described concepts can be used alone or in combination with any or all of the other above described concepts. Although an embodiment of this invention has been disclosed, a worker of ordinary skill in this art would recognize that certain modifications would come within the scope of this invention. For that reason, the following claims should be studied to determine the true scope and content of this invention.

The invention claimed is:

1. A method for determining a legitimacy of a received website comprising:
    determining a similarity between a received website and at least one known illegitimate website by at least comparing a line density of the received website against a line density of a list of known illegitimate website, where a line density of a website is determined by the relationship LD=s/l, where LD is the line density, s is the size of the website and l is the number of lines of code used to present the website; and
    determining a presence of a relationship between the received website and the at least one known illegitimate website and determining that the received website is illegitimate in response to determining the presence of the relationship, the relationship comprising at least a minimum threshold of similarity between the at least one known illegitimate website and the received website.

2. The method of claim 1, further comprising generating a network visualization identifying a plurality of websites and a relationship between each website and each other website in said plurality of websites, wherein each relationship is a correlation between at least one of a website text, a website code, and website information of the correlated websites.

3. The method of claim 2, wherein the correlation between at least one of a website text, a website code, and website information is a similarity between the at least one of the website text, the website code, and the website information.

4. The method of claim 2, further comprising determining the presence of an illegitimate enterprise in response to the network visualization indicating a relationship between a number of websites in said plurality of websites in excess of an enterprise threshold.

5. The method of claim 4, wherein determining the presence of an illegitimate enterprise in response to the network visualization indicating a relationship between a number of websites in said plurality of websites in excess of an enterprise threshold further comprises identifying a common ownership by one of an individual and a group of individuals of each of the related websites.

6. A method for determining a legitimacy of a website comprising:
retrieving website content from a website;
analyzing the website content by at least determining a line density of the website, wherein the line density of the website is determined by the relationship LD=s/l, where LD is the line density, s is the size of the website and l is the number of lines of code used to present the website, and determining a website score based at least partially on the analysis;
determining that the website is illegitimate in response to said website score exceeding a threshold;
storing the determination in a data storage element.

7. The method of claim 6, wherein retrieving website content from a website includes at least one of parsing said website for known data types, extracting metadata of the website, retrieving a full source code of the website, determining an IP address geolocation, and extracting whois data of the website.

8. The method of claim 6, further comprising:
receiving a suspected URL from at least one of a user and a computerized process;
parsing the suspected URL by separating the URL into at least two underlying URL components; and
comparing the parsed URL against a list of previously analyzed URL's in said data storage element, thereby determining if said URL has been previously analyzed.

9. The method of claim 6, wherein analyzing the website content further comprises:
comparing retrieved web site content against a list of known illegitimate patterns and illegitimate parameters and incrementing said website score by a corresponding magnitude for each identified illegitimate pattern and each matching illegitimate parameter; and
calculating at least one of a website complexity, the website line density, and a HASH value of the web site, and comparing at least one calculated website complexity, website line density, and HASH value of the website against a database of known illegitimate website complexities, website line densities and HASH values of websites and incrementing said website score by a corresponding magnitude for each illegitimate website complexity, website line density and HASH value of the website within a tolerance value of the corresponding website characteristic.

10. The method of claim 6, wherein analyzing the website content further comprises: comparing retrieved web site content against a list of blacklist content and determining that the website is illegitimate in response at least a portion of the website content matching an entry in said list of blacklist content.

11. The method of claim 6, further comprising determining that said website is suspicious based on at least one criteria, when said website score is below said threshold and flagging said suspicious website for manual review.

12. The method of claim 11, wherein said manual review comprises at least one of a code analysis, an image analysis, an nGram analysis, and a registrant analysis, and wherein said manual review is at least partially performed by a user.

13. The method of claim 6, further comprising maintaining a list of analyzed websites and providing a user interface operable to allow a user to query said list of analyzed websites.

14. The method of claim 13, wherein said list of analyzed websites is stored in at least one exportable format.

15. A computer system comprising:
a first computer connected to the Internet,
a data storage element interfaced with said first computer such that said first computer is operable to query said data storage element and operable to store and edit data stored in said data storage element, wherein the data storage element is further operable to store previously analyzed website information;
a user interface operable to allow a user to interact with and control said first computer; and
a non-transitory computer readable medium storing instructions operable to cause said first computer to perform the steps of retrieving website content from a website, analyzing the website content and determining a website score based at least partially on the analysis, determining that the website is illegitimate in response to said website score exceeding a threshold, and storing the determination in the data storage element in response to at least one command received at said user interface, wherein determining the website score includes at least determining a similarity between the received website and the at least one known illegitimate website by comparing a line density of the received website against a line density of a list of known illegitimate website, where a line density of a website is determined by the relationship LD=s/l, where LD is the line density, s is the size of the website and l is the number of lines of code used to present the website.

* * * * *